United States Patent [19]

Baglin

[11] Patent Number: 4,669,141
[45] Date of Patent: Jun. 2, 1987

[54] METHOD OF MAKING A THREADED INSERT

[75] Inventor: Michel Baglin, Mamers, France

[73] Assignee: Simmonds S.A., France

[21] Appl. No.: 745,068

[22] Filed: Jun. 17, 1985

[30] Foreign Application Priority Data

Jun. 20, 1984 [FR] France ................................ 84 09684

[51] Int. Cl.⁴ ............................................. B21D 53/24
[52] U.S. Cl. .................................................... 10/86 A
[58] Field of Search ................... 10/72 R, 79, 80, 85, 10/86 R, 86 A, 152 R; 411/178, 283, 284

[56] References Cited

U.S. PATENT DOCUMENTS

| | | | |
|---|---|---|---|
| 2,754,871 | 7/1956 | Stoll | 10/86 A |
| 2,791,787 | 5/1957 | Neuschotz | 10/86 A |
| 3,081,808 | 3/1963 | Rosan et al. | 10/86 A |
| 3,163,872 | 1/1965 | Rosan et al. | 10/86 |
| 3,220,029 | 11/1965 | Neuschotz | 10/86 |
| 3,334,365 | 8/1967 | Rosan et al. | 10/86 R |
| 3,391,721 | 7/1968 | Rosan et al. | 151/21 |

FOREIGN PATENT DOCUMENTS

| | | |
|---|---|---|
| 1167418 | 11/1958 | France . |
| 1187602 | 9/1959 | France . |
| 1308201 | 9/1962 | France . |
| 1101669 | 1/1968 | United Kingdom . |

Primary Examiner—E. Michael Combs
Attorney, Agent, or Firm—Steinberg and Raskin

[57] ABSTRACT

The present invention relates to a method of making a threaded insert, a tool for carrying out the said method and the insert thus obtained which presents the form of a cylindrical tube provided with an external thread and an internal thread, and with a plurality of imprints directed towards the axis of the insert and located inside the remaining and intact cylindrical shape of the insert.

4 Claims, 5 Drawing Figures

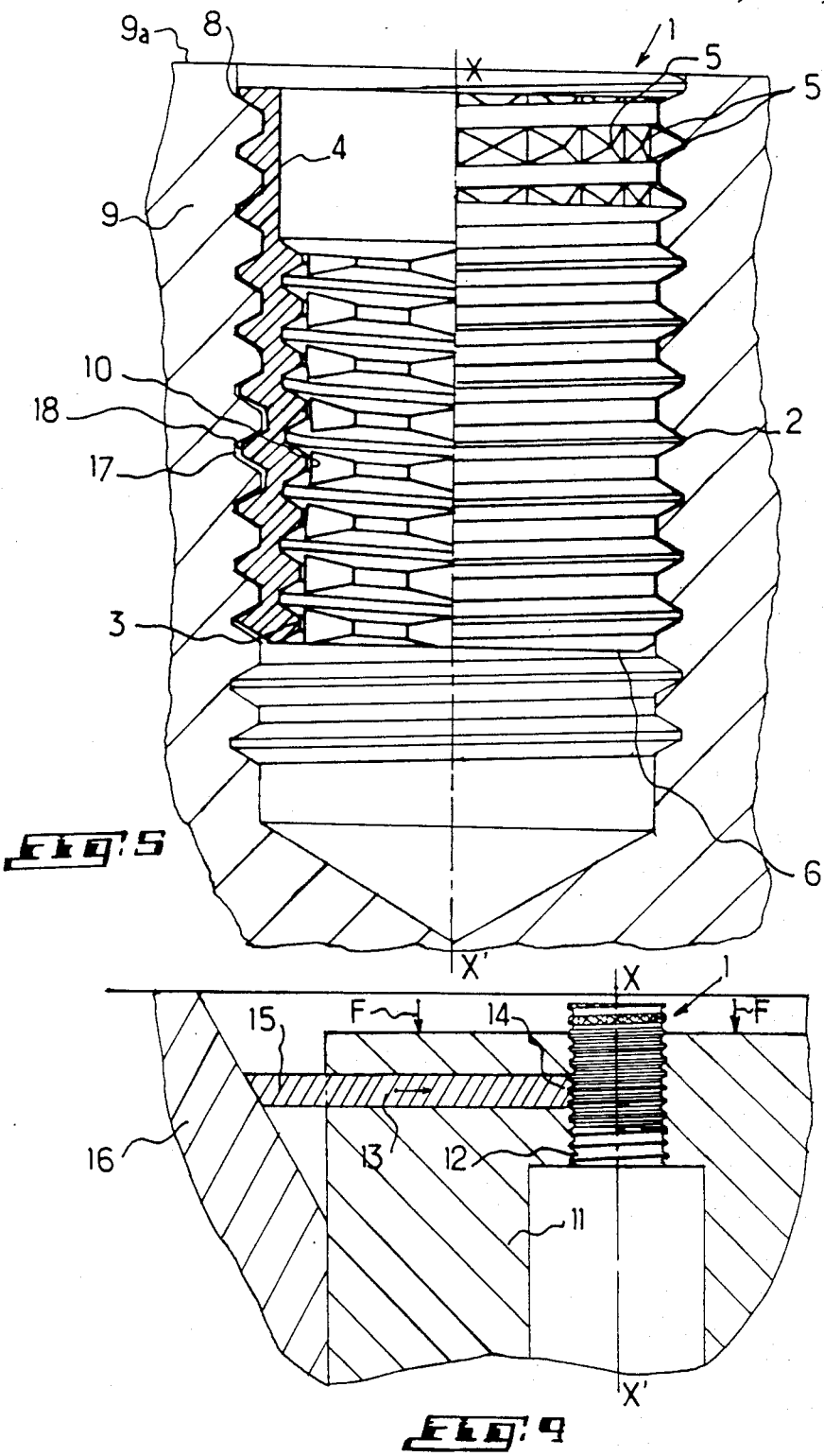

METHOD OF MAKING A THREADED INSERT

BACKGROUND OF THE INVENTION

The present invention has essentially for a subject matter a method of making an externally and internally threaded insert, as well as a tool for carrying out the said method.

It is also directed to an insert obtained by means of such a method and/or such a tool.

It is known that, in order to obtain screwed assemblies, a certain number of internally threaded holes must be machined in a solid workpiece, whereafter any desired element can be attached thereto by screwing. In such assemblies, however, the resistance of the internal thread after the screwing may prove to be too low for them to withstand the tensile force exerted by the screws. Consequently, the co-operating threads of the tapped hole and of the screw may be damaged. The same applies in case of frequent disassemblings of the assembled parts, since, as is readily understood, the threads become worn and therefore deteriorate in the course of time. Moreover, it is extremely difficult, if not impossible, especially as regards the parts used in the aircraft industry, to provide the internally threaded hole with means for self-locking of the screw during the screwing.

Consequently, to overcome these disadvantages, it has already been proposed to use in the screwed assemblies intermediate inserts in the form of small, externally and internally threaded cylindrical tubes.

More precisely, the insert is screwed into the internally threaded hole provided in the solid body, and then set in the said hole by its upper portion, whereafter a screw can be screwed into the insert to fasten any desired element to the said body.

Since the insert is made from a hard material and its external thread is anchored in the internally threaded hole, it is understood that the abovementioned disadvantages resulting from the use of a simple internally threaded hole are removed.

However, problems arise when it is desired to provide such inserts with means for the self-locking of the screw. To this end, the insert may for example be deformed or ovalized prior to its insertion into the internally threaded hole, but such deformation disappears under the action of the introduction and screwing of the insert into the internally threaded hole which is perfectly circular, so that the self-locking effect sought is reduced to nothing. Since it is absolutely necessary, especially in the aircraft industry, that the insert should possess self-locking features, the insert which does not offer the required self-locking features must therefore be extracted from the internally threaded hole by cutting-off its set portion by means of, for example, a small milling cutter, until the said hole is provided with an insert really offering sufficient and efficient self-locking features when screwing the screw.

It is therefore understood that the successive insert interchanging or replacing steps to be carried out until an insert is obtained which, once positioned, offers the required self-locking features, are extremely difficult, time-cnsuming and expensive, to say nothing of the risk of damaging the threads of the threaded hole when cutting off the set portion of the insert and extracting it.

SUMMARY OF THE INVENTION

In other words, the obtaining of screwed assemblies in series is incompatible with all the abovementioned steps, and the present invention has in particular for a purpose to solve this problem by providing an improved insert which always retains its deformation allowing the self-locking of the screw and is therefore unaffected by the step of inserting or screwing it into the internally threaded hole.

To this end, the invention has for a subject matter a method of making an insert in the general form of an internally and externally threaded cylindrical tube, characterized in that, in order to obtain the external thread of the insert while at the same time providing the said insert with self-locking features, an internally threaded hole is first made in a body provided with at least one striker or the like adapted to project into the said hole by its active face which is subjected to tapping at the same time as the whole of the hole, the insert is screwed into the said hole to form on its external periphery a male thread corresponding to the female thread defined by the hole and the active face of the striker, a pressure is exerted on the striker towards the axis of the hole and of the insert to locally produce on the wall of the said insert at least one imprint projecting towards the interior of the latter without altering the remaining cylindrical shape of the insert, whereafter the striker is retracted and the insert is withdrawn from the internally threaded hole by unscrewing.

The invention is also directed to a tool for carrying out the above method, including a body in which is made an internally threaded hole, the said tool being characterized by at least one striker slidingly mounted in the said body in a direction substantially perpendicular to the axis of the hole, and the active end of which is provided with threads filling the gap in continuity of the threads of the hole, whereas at its other end, the striker is adapted to be actuated by a press or the like.

According to a preferred form of embodiment, the striker is adapted to be actuated through the medium of a taper element mounted around the said body and acting upon the other striker end.

There may advantageously be provided three strikers slidably mounted in the said body and spaced apart by an angle substantially equal to 120° from each other.

The invention is also directed to an insert obtained by using the method and/or the tool complying with the abovementioned features, the said insert being in the general form of a cylindrical tube provided in particular with an external thread and an internal thread, and being characterized in that the said tube is provided with at least one deformation, imprint or the like, directed towards the axis of the said tube and located inside the remaining cylindrical shape of the insert without being deformed.

The insert may be provided for example with three imprints spaced apart by an angle substantially equal to 120° from each other.

It is therefore understood that these imprints allow a self-locking of the screw and are not reduced to nothing under the action of the screwing of the insert into the internally threaded hole, since all the externally threaded portions of the insert, outside the said imprints, remain perfectly cylindrical and can therefore be screwed into the threaded hole without subjecting the wall of the insert to any deforming force capable of removing the imprints.

Other advantages and features of the invention will appear more clearly from the following detailed description with reference to the appended drawings given solely by way of example and wherein:

BRIEF DESCRIPTION OF THE DRAWINGS

FIG. 4 is a diagrammatic partial and vertical sectional view of a tool for making the insert, and FIG. 5 is an enlarged elevational view of the insert mounted in the internally threaded hole of a body, the said view consisting of two half-views as in FIG. 1.

DESCRIPTION OF THE PREFERRED EMBODIMENTS

Figure 1:
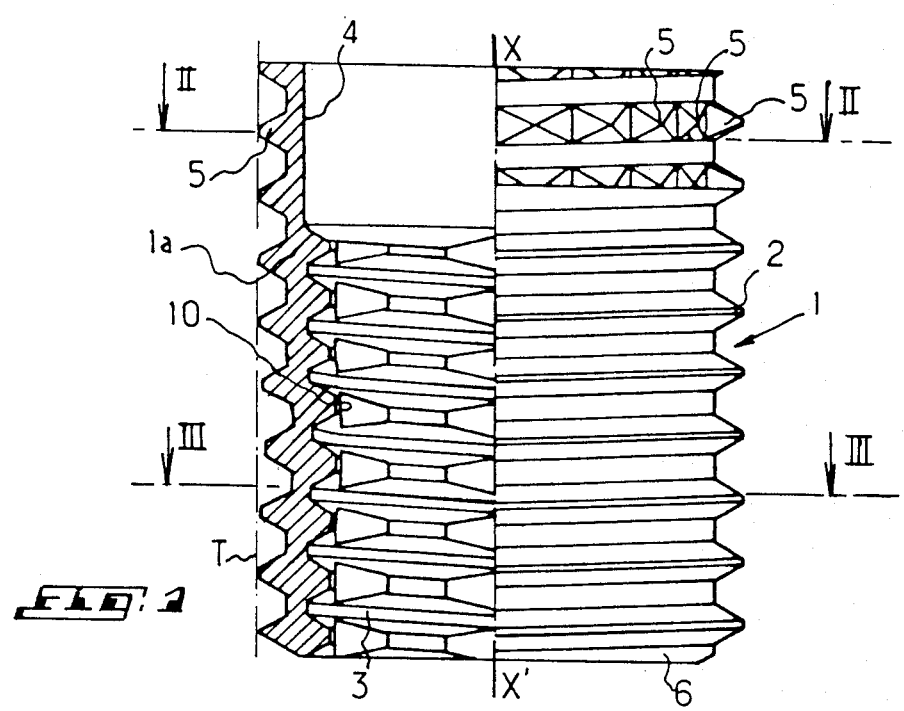
FIG. 1 is an elevational view of an insert according to the invention, consisting of two half-views, i.e., an external half-view and an axial sectional half-view, respectively.

Referring to the appended drawings, there is seen an insert which is in the general form of a cylindrical tube provided with an external thread 2 and an internal thread 3, both extending on only a portion of the tube height.

More specifically, the upper portion of the insert or cylindrical tube 1 includes an internal even-walled counterbore 4 and is provided externally with a knurling constituted by one or several rows of teeth or the like 5, the function of which will be explained later. The internal thread 3 extending from the knurling to the base 6 of the tubular insert 1 has a cross-section of non-cylindrical shape, for example of hexagonal shape, as shown at 7 in FIG. 3. Thus, a male hexagonal key, e.g. of the Allen type, may, after being introduced into the insert 1, come into engagement with the internal hexagonal profile of the insert so as to allow its screwing by means of its external thread 2 into the internally threaded orifice 8 provided in the body 9, as will be described later.

According to the invention, the tubular wall 1a of the insert 1 is provided with one or several deformations, imprints or the like 10 directed towards the axis X—X' of the tube 1 and located inside the remaining cylindrical shape of the tube. Otherwise stated, the external thread 2 remains perfectly circular outside the imprints 10, as shown at 11 in FIG. 3.

Figures 2, 3:
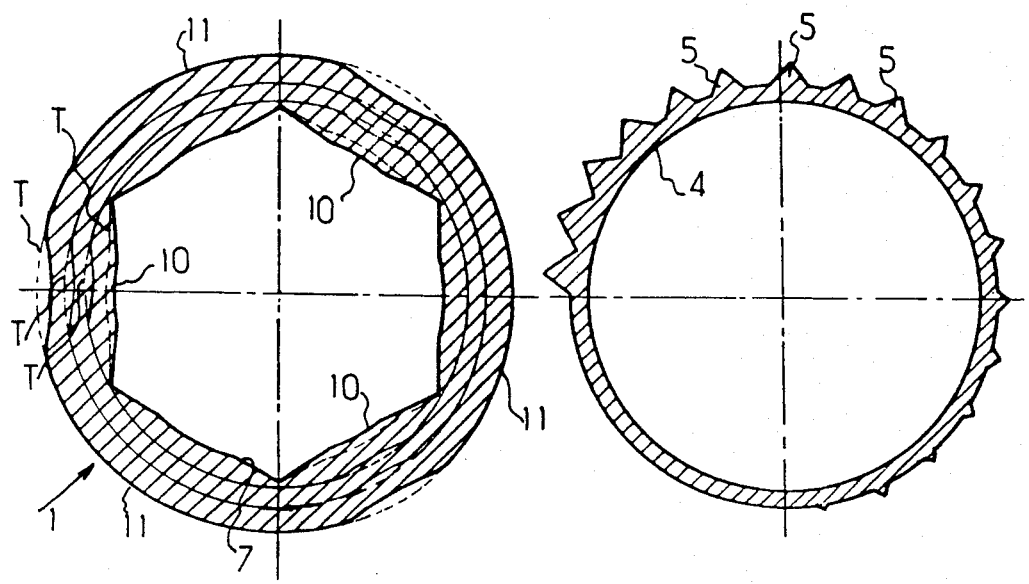
FIG. 2 is a sectional view upon the line II—II of FIG. 1.
FIG. 3 is a sectional view upon the line III—III of FIG. 1.

According to a preferred form of embodiment and as seen also in FIG. 3, there are provided three imprints such as 10 spaced apart by an angle substantially equal to 120° from each other.

For the imprints 10 as well as the perfectly cylindrical shape of the external thread 2 outside these imprints to be better seen, the shape of the insert 1 prior to deformation is shown in FIGS. 1 and 3 by dash-dotted lines T.

The three imprints 10 ensure the self-locking of the screw (not shown) introduced into the insert 1, as will be explained in detail later.

There will now be described the tool for making the insert represented in FIGS. 1 to 3, by referring to FIG. 4.

This tool, which is shown very diagrammatically, includes essentially a body or member 11 in which is provided an internally threaded hole 12. One or several strikers or the like, such as 13, are mounted in the member 11 slidingly in a direction substantially perpendicular to the tapped-hole axis X—X'.

The strikers 13 are adapted to project into the internally threaded hole 12 by their active face 14. It is essential to note here that the active end or face 14 of the strikers 13 are provided with threads filling the gap in continuity of the threads of the tapped hole, since, according to an essential feature of the invention, the tapping of the hole 12 is performed at the same time as that of the active face 14 flush with the wall of the said hole.

The strikers 13 are adapted to be actuated by a taper element 16 mounted around the body 11 and acting upon the ends 15.

The manufacture of the insert 1 according to the invention is carried out in the following manner.

After providing the hole 12 of the body 11 at the same time as the active face 14 of the strikers 13 with internal threads, the insert 1 is screwed into this hole as clearly seen in FIG. 4, so that the external male threads 2 are made on the external periphery of the said insert. Thereafter, a pressure is exerted, e.g. by means of a press, on the body 11 in the direction of the arrows F seen in FIG. 4. The body 11 thus moves downward so that the strikers 13 bearing by their end 15 upon the taper element 16 are actuated towards the axis X—X' of the tapped hole 12 and of the insert 1 to produce on the wall of the latter the imprints 10 without altering the remaining cylindrical shape of the insert. Thereafter, the body 11 is raised, the strikers 13 are retracted and the insert 1 is withdrawn by unscrewing from the internally threaded hole 12, the said insert thus being ready for use as will be described.

It should be noted here, however, that, according to a preferred form of embodiment of the tool, the body 11 is provided with three strikers 13 spaced apart by an angle substantially equal to 120° from each other so as to produce three imprints 10 as can be clearly seen in FIG. 3. Of course, the number of strikers 13 depends on the number of imprints 10 which it is desired to obtain, it being understood that, without departing from the scope of the invention, these imprints could be made in one or several planes.

Reference is now made to FIG. 5 which illustrates the use of the insert of the invention. The insert 1 is introduced by screwing into the internally threaded orifice 17 of the member 9 on the upper surface 9a of which the desired element is to be attached.

It is essential to point out here that the screwing of the insert 1 is performed without any difficulty and without any risk of deformation and removal of the imprints 10, since, as explained previously, the external thread 2 of the said insert is perfectly cylindrical outside the imprints 10. These imprints 10 which in fact form very small protuberances directed towards the axis X—X' of the insert 1 are well seen in FIG. 5 by the fact that a space 18 is left between the male external thread 2 and the female thread of the hole 17.

It will also be stressed here that the imprints 10 cannot be altered by any screwing reaction of the insert 1 in the tapped orifice 17. After the screwing of the insert 1, as shown in FIG. 5, the upper portion of the insert 1 is flared radially outwardly by means of a suitable tool introduced into the internal counterbore 4. Thus, the knurls or teeth 5 engage the internally threaded wall of the hole 17 of the member 9, and the insert 1 is thus set and fixed in this hole. It is then sufficient to place on the body 9 the element which it is desired to attach thereto by means of a screw introduced into the insert 1. As will be understood, this screw is self-locked in the insert owing to the presence of the imprints 10 constricting the internal thread 3 of the insert. The assembly thus obtained is thus perfect, which is essential in many applications and more particularly in the aircraft industry.

There is thus obtained according to the invention an insert provided with self-locking means which may in no way be altered or reduced to nothing when the insert is introduced into a machine member by screwing.

Of course, the invention is by no means limited to the form of embodiment described and illustrated which has been given by way of example only.

For example, the insert 1 may be provided with imprints in any number and at any locations without departing from the scope of the invention which includes all technical equivalents to the means described as well as their combinations should the latter be carried out according to its gist.

What is claimed is:

1. A method for making an insert from an internally threaded cylindrical tube, comprising the steps of
    screwing a tube into a hole of a body defined by a threaded surface so as to form a corresponding external thread on the outer periphery of said tube, while securely retaining said tube within said hole with its outer periphery supported by said hole-defining surface, providing a striker having an active surface having threads corresponding to the threads formed on said hole-defining surface and of the outer periphery of said tube, and
    projecting said striker into said hole to exert a pressure towards an axis of said hole to locally produce on the retained externally threaded tube, at least one imprint protruding towards an interior of said tube without altering the remaining cylindrical shape of the same due to said tube periphery being supported by said threaded hole-defining surface.

2. The method of claim 1 comprising the additional steps of
    providing three strikers oriented at substantially 120° intervals about said hole-defining surface.

3. The method of claim 1, comprising the additional step of
    bearing an end of said striker opposite said active surface thereof against a taper element.

4. The method of claim 3, wherein the striker is projected into said hole and against said tube by the step of
    moving said body in a direction substantially parallel to the axis of said hole,
    whereby the striker is actuated toward the axis of the hole by bearing against the taper element.

* * * * *